United States Patent
Chen et al.

(10) Patent No.: US 6,665,026 B2
(45) Date of Patent: Dec. 16, 2003

(54) LIQUID CRYSTAL DISPLAY

(75) Inventors: Meng-Te Chen, Taipei (TW); Pei-Chang Wang, Taichung (TW)

(73) Assignee: Sung-Pen Lin, Taichung (TW)

(*) Notice: Subject to any disclaimer, the term of this patent is extended or adjusted under 35 U.S.C. 154(b) by 245 days.

(21) Appl. No.: 09/865,435

(22) Filed: May 29, 2001

(65) Prior Publication Data

US 2001/0043295 A1 Nov. 22, 2001

(30) Foreign Application Priority Data

May 19, 2000 (TW) .................................... 089208459

(51) Int. Cl.⁷ ............................................. G02F 1/1347
(52) U.S. Cl. .............................. 349/74; 349/75; 349/76; 349/81
(58) Field of Search .................................. 349/74, 75, 78, 349/80, 81, 106, 179, 123

(56) References Cited

U.S. PATENT DOCUMENTS

| | | | | |
|---|---|---|---|---|
| 4,842,379 A | * | 6/1989 | Oishi et al. ..................... 349/2 |
| 4,966,441 A | * | 10/1990 | Conner ......................... 349/80 |
| 5,122,887 A | * | 6/1992 | Mathewson ................... 349/80 |
| 5,726,723 A | * | 3/1998 | Wang et al. ................... 349/75 |
| 5,751,385 A | * | 5/1998 | Heinze ......................... 349/61 |
| 6,437,843 B1 | * | 8/2002 | Van De Witte et al. ..... 349/117 |
| 6,504,588 B1 | * | 1/2003 | Kaneko ........................ 349/71 |

* cited by examiner

Primary Examiner—Kenneth Parker
Assistant Examiner—David Y Chung
(74) Attorney, Agent, or Firm—Rosenberg, Klein & Lee

(57) ABSTRACT

A liquid crystal display includes at least two liquid crystal display units that are stacked up one another. Each liquid crystal display unit comprises, from top to bottom, a first polarizer, a first substrate, a first pile layer, a liquid crystal layer, a second pile layer, a second substrate, and a second polarizer. The liquid crystal layer has a twist angle of zero or greater than zero. All of the first polarizer, the first substrate, the first pile layer, the liquid crystal layer, the second pile layer, the second substrate, and the second polarizer in each said liquid crystal display unit are adhered to each other by means of whole-face bonding by transparent or non-transparent glue. Alternatively, all of the first polarizer, the first substrate, the first pile layer, the liquid crystal layer, the second pile layer, the second substrate, and the second polarizer in each said liquid crystal display unit are adhered to each other by means of peripheral-bonding by transparent or non-transparent glue.

13 Claims, 5 Drawing Sheets

LIQUID CRYSTAL DISPLAY

BACKGROUND OF THE INVENTION

1. Field of the Invention

The present invention relates to a liquid crystal display that is composed of at least two stacked liquid crystal display units.

2. Description of the Related Art

Liquid crystal display has been used in many fields, e.g., electric shutters for cameras. Electric shutters are designed to fulfill the need of formation of three-dimensional image that cannot be achieved by mechanic shutters. Nevertheless, the screening range of the conventional liquid crystal display for electric shutters is poor. More specifically, the screening range of the conventional liquid crystal display for electric shutters is about 0~5 degrees, as shown in FIG. 6. Residual image is thus generated. As a result, the resultant image is not clear as having an overlapped portion. In addition, the conventional liquid crystal display has limits in view orientation, view angle, and contrast. More specifically, the user of a camera having an electric shutter using conventional liquid crystal cannot obtain clear image unless the camera is used in special view orientations, at special view angles, and has special color contrast Furthermore, the right eye sees a portion of the image in the left eye and the left eye sees a portion of the image in the right eye. Namely, the two images in the right and left eyes have an overlapped portion. This causes pressure to the brain and the vision system and the user has eyestrain. It takes a period of time for the user to recover after he/she has get used to the overlapping of images. This problem aggravates when the user is an aged person or a child. The present invention is intended to provide an improved liquid crystal display that mitigates and/or obviates the above problems.

SUMMARY OF THE INVENTION

A liquid crystal display in accordance with the present invention comprises at least two liquid crystal display units that are stacked up one another. Each liquid crystal display unit comprises, from top to bottom, a first polarizer, a first substrate, a first pile layer, a liquid crystal layer, a second pile layer, a second substrate, and a second polarizer.

The first and second substrates are made from glass. The liquid crystal layer has a twist angle of zero or greater than zero. All of the first polarizer, the first substrate, the first pile layer, the liquid crystal layer, the second pile layer, the second substrate, and the second polarizer in each said liquid crystal display unit are adhered to each other by means of whole-face bonding by transparent or non-transparent glue. Alternatively, all of the first polarizer, the first substrate, the first pile layer, the liquid crystal layer, the second pile layer, the second substrate, and the second polarizer in each said liquid crystal display unit are adhered to each other by means of peripheral-bonding by transparent or non-transparent glue.

The first glass substrate and the first pile layer have a conductive layer therebetween. Alternatively, the first glass substrate and the first pile layer have a conductive layer and an insulating layer therebetween. The second glass substrate and the second pile layer have a conductive layer therebetween. Alternatively, the second glass substrate and the second pile layer have a conductive layer and an insulating layer therebetween.

Each of the first substrate and the second substrate has a seal applied to a periphery thereof, thereby providing a sealed space for receiving liquid crystal that forms the liquid crystal layer. One of the second polarizer of an upper one of two stacked said liquid crystal display units and the first polarizer of a lower one of the two stacked said liquid crystal units may be removed such that two adjacent stacked liquid crystal display units share a common polarizer therebetween.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
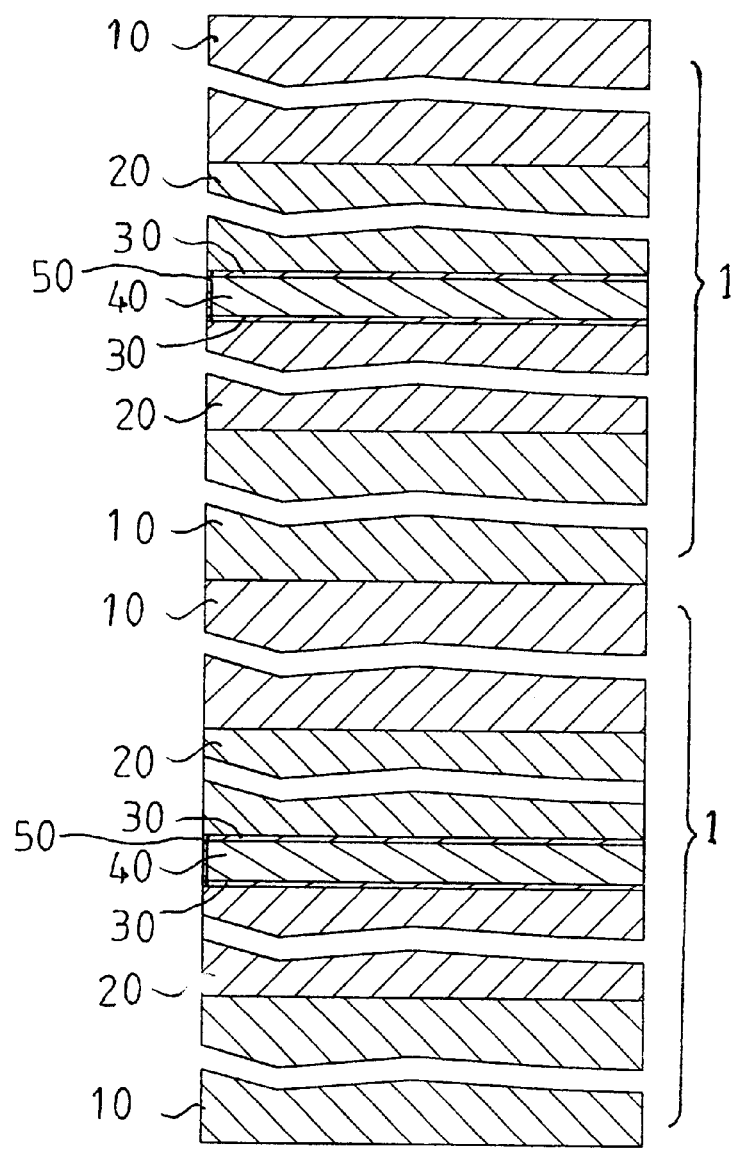
FIG. 1 is a sectional view of a liquid crystal display in accordance with the present invention.

FIG. 1 shows two liquid crystal display units 1 that are stacked up one upon the other to form the liquid crystal display in accordance with the present invention having a better screening effect. Each liquid crystal unit 1 includes, from top to bottom, a first polarizer 10, a first glass substrate 20, a first pile layer 30, a liquid crystal layer 40, a second pile layer 30, a second glass substrate 20, and a second polarizer 10. Seal 50 is applied to a periphery of each glass substrate 20, thereby providing a sealed space between the first glass substrate 20 and the second glass substrate 20 for receiving the liquid crystal that forms the liquid crystal layer 40. Each polarizer 10 allows relative light waves to pass therethrough. Each glass substrate 20 is transparent to allow image light waves to pass therethrough. Each pile layer 30 can be disposed according to need, so as to match different view angles. The liquid crystal layer 40 has a twist angle of zero or greater than zero. As illustrated in FIG. 1, the two liquid crystal display units 1 are stacked up one upon the other to form the liquid crystal display in accordance with the present invention having a better screening effect. The number of the liquid crystal display units 1 is not limited. Namely, one may stack up the liquid crystal display units 1 as many as he/she wishes. The layers in each liquid crystal display unit 1 are adhered to each other by means of whole-face bonding by transparent or non-transparent glue, such as thermosetting glue, AB(two component liquid adhesive) glue, or UV(ultra light-weld adhesive) glue. Alternatively, the layers in each liquid crystal display unit are adhered to each other by means of peripheral bonding by transparent or non-transparent double-sided tape, epoxy resin, thermosetting glue, AB(two component liquid adhesive) glue, or UV(ultra light-weld adhesive) glue. The liquid crystal layer 40 may be colored to increase the screening effect.

Figure 5:
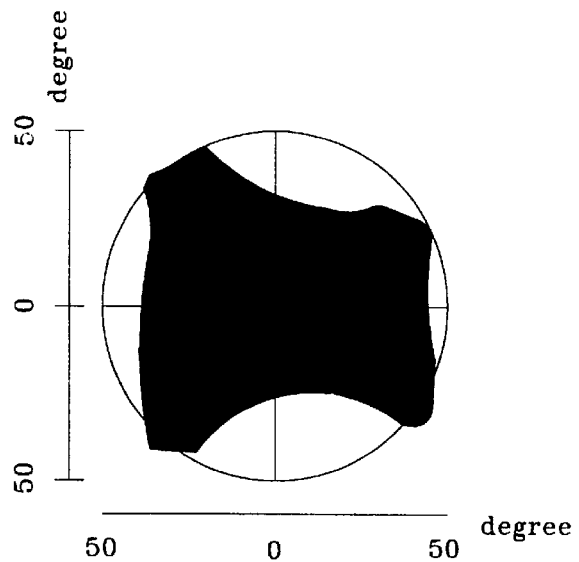
FIG. 5 is a schematic diagram illustrating the screening range of the liquid crystal display in accordance with the present invention.
Figure 6:
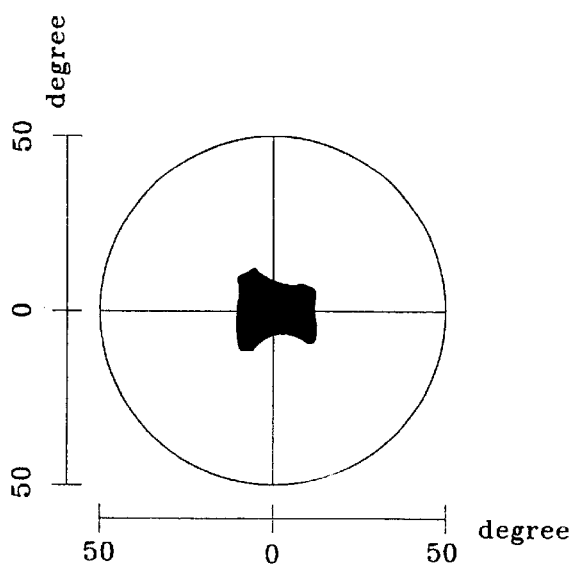
FIG. 6 is a schematic diagram illustrating the screening range of a conventional liquid crystal display.

When used as an electric shutter, as illustrated in FIG. 5, the effective screening range of the resultant liquid crystal display in accordance with the present invention is broadened to be about 0~35 degrees. Thus, the liquid crystal display in accordance with the present invention may be operated in wider view orientations and view angles and provide a better contrast effect. The liquid crystal display in accordance with the present invention may be used in electric shutters that require higher screening effect. The dead angle for screening is obviated by the liquid crystal display formed by at least two stacked liquid crystal display units. The view angle for forming image becomes larger and the resultant three-dimensional image is very clear. The liquid crystal display thus formed causes less harm to the vision system of the user even after a long-term use. The image in the right eye of the user and the image of the left eye of the user are not overlapped, thereby forming a three-dimensional image in the brain.

Figure 2:
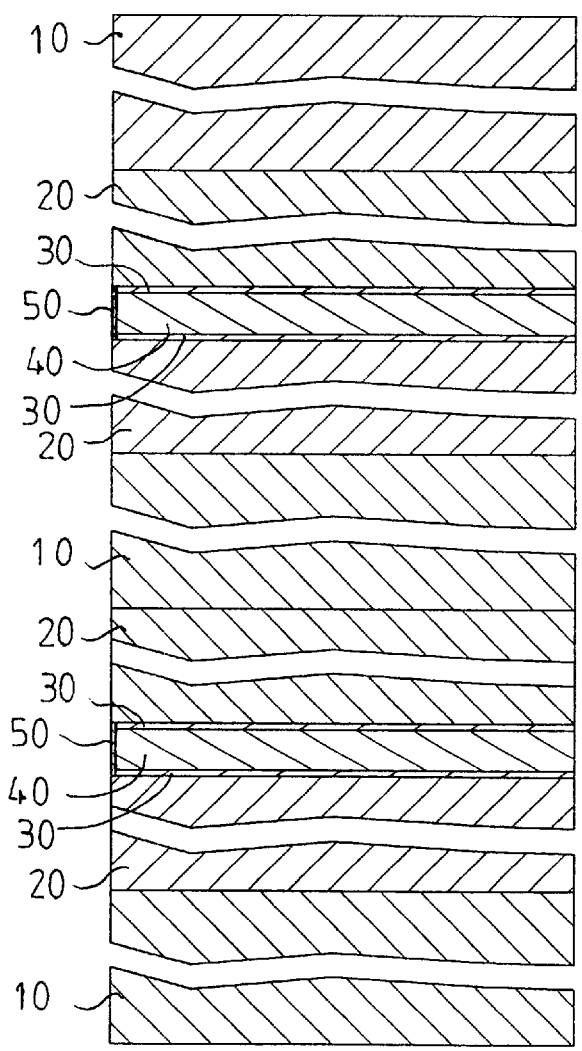
FIG. 2 is a sectional view of a modified embodiment of the liquid crystal display in accordance with the present invention.
Figure 3:
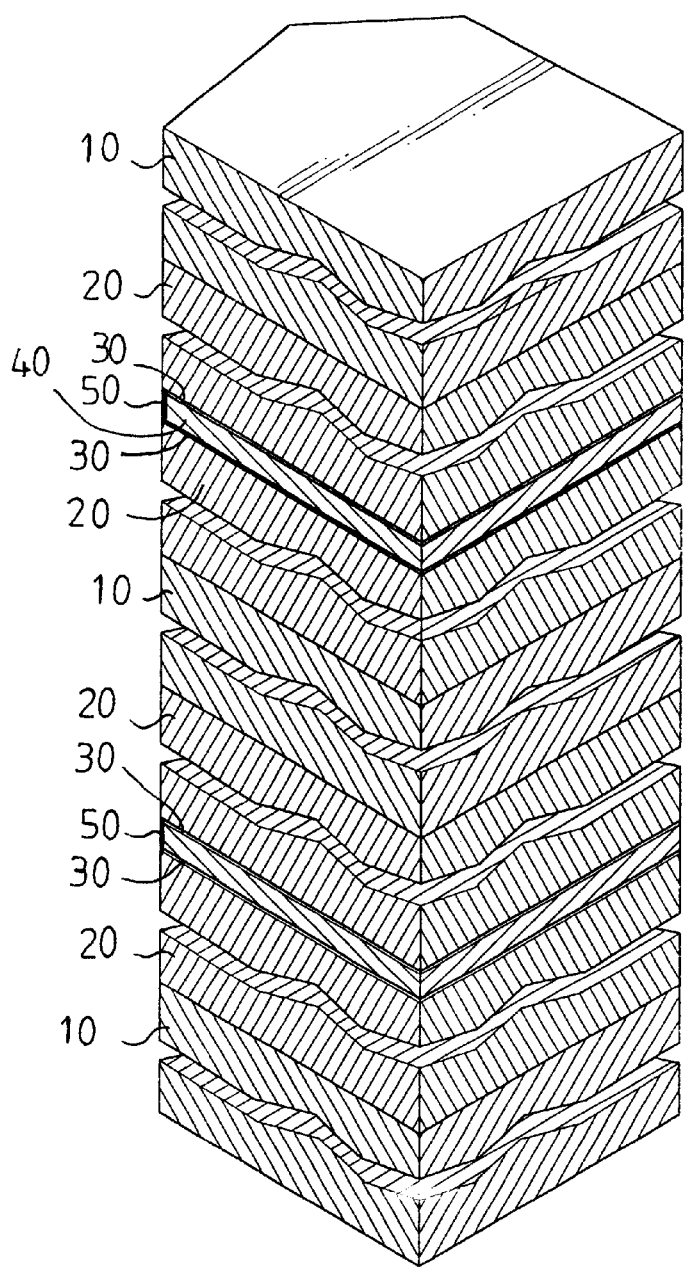
FIG. 3 is a perspective view of the modified embodiment of the liquid crystal display in FIG. 2.
Figure 4:
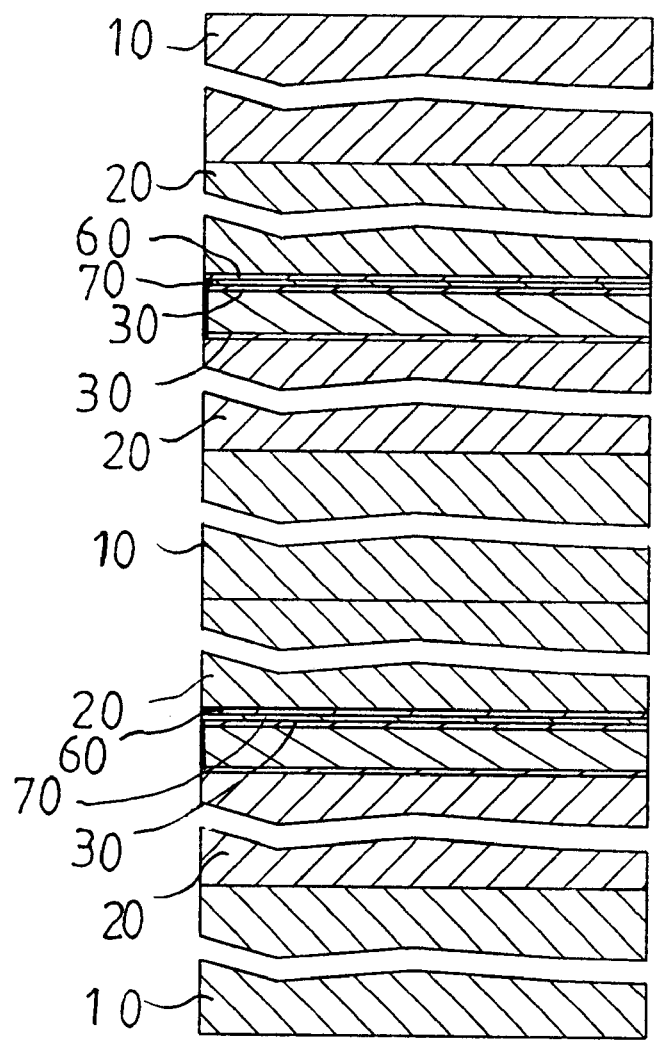
FIG. 4 is a sectional view of another modified embodiment of the liquid crystal display in accordance with the present invention.

FIGS. 2 and 3 show a modified embodiment of the invention, wherein one of the second polarizer 10 of an upper one of two stacked liquid crystal display units 1 and the first polarizer 10 of a lower one of the two stacked liquid crystal units 1 is removed. FIG. 4 illustrates another modified embodiment of the invention, wherein a conductive layer 60 and an optional insulating layer 70 is provided between the glass substrate 20 and the pile layer 30.

The liquid crystal display in accordance with the present invention can be used in many fields, not limited to electric shutters.

Although the invention has been explained in relation to its preferred embodiment, it is to be understood that many other possible modifications and variations can be made without departing from the scope of the invention as hereinafter claimed.

What is claimed is:

1. A liquid crystal display comprising:
    at least two liquid crystal display units defined in stacked manner one over the other for expanding a screening range of the liquid crystal display,
    each said liquid crystal display unit including:
        at least a pair of polarizers,
        a first substrate disposed against a first of the polarizers,
        a second substrate disposed against a second of the polarizers,
        a first pile layer, a liquid crystal layer, and a second pile layer being disposed between the first and second substrates, the liquid crystal layer being disposed between the first and second pile layers.

2. The liquid crystal display as claimed in claim 1, wherein the first substrate and the second substrate are made from glass.

3. The liquid crystal display as claimed in claim 1, wherein the liquid crystal layer has a twist angle of zero or greater than zero.

4. The liquid crystal display as claimed in claim 1, wherein all of the first polarizer, the first substrate, the first pile layer, the liquid crystal layer, the second pile layer, the second substrate, and the second polarizer in each said liquid crystal display unit are adhered to each other by means of whole-face bonding by transparent glue.

5. The liquid crystal display as claimed in claim 1, wherein all of the first polarizer, the first substrate, the first pile layer, the liquid crystal layer, the second pile layer, the second substrate, and the second polarizer in each said liquid crystal display unit are adhered to each other by means of whole-face bonding by non-transparent glue.

6. The liquid crystal display as claimed in claim 1, wherein all of the first polarizer, the first substrate, the first pile layer, the liquid crystal layer, the second pile layer, the second substrate, and the second polarizer in each said liquid crystal display unit are adhered to each other by means of peripheral-bonding by transparent glue.

7. The liquid crystal display as claimed in claim 1, wherein all of the first polarizer, the first substrate, the first pile layer, the liquid crystal layer, the second pile layer, the second substrate, and the second polarizer in each said liquid crystal display unit are adhered to each other by means of peripheral-bonding by non-transparent glue.

8. The liquid crystal display as claimed in claim 1, wherein the first glass substrate and the first pile layer have a conductive layer therebetween.

9. The liquid crystal display as claimed in claim 1, wherein the first glass substrate and the first pile layer have a conductive layer and an insulating layer therebetween.

10. The liquid crystal display as claimed in claim 1, wherein the second glass substrate and the second pile layer have a conductive layer therebetween.

11. The liquid crystal display as claimed in claim 1, wherein the second glass substrate and the second pile layer have a conductive layer and an insulating layer therebetween.

12. The liquid crystal layer as claimed in claim 1, wherein each of the first substrate and the second substrate has a seal applied to a periphery thereof, thereby providing a sealed space for receiving liquid crystal that forms the liquid crystal layer.

13. The liquid crystal layer as claimed in claim 1, wherein one of the second polarizer of an upper one of two stacked said liquid crystal display units and the first polarizer of a lower one of the two stacked said liquid crystal units is removed.

* * * * *